United States Patent [19]
Wang et al.

[11] Patent Number: 6,006,299
[45] Date of Patent: Dec. 21, 1999

[54] APPARATUS AND METHOD FOR CACHING LOCK CONDITIONS IN A MULTI-PROCESSOR SYSTEM

[75] Inventors: Wen-Hann Wang, Portland; Konrad K. Lai, Aloha; Gurbir Singh, Portland; Mandar S. Joshi, Beaverton; Nitin V. Sarangdhar, Beaverton; Matthew A. Fisch, Beaverton, all of Oreg.

[73] Assignee: Intel Corporation, Santa Clara, Calif.

[21] Appl. No.: 08/204,592

[22] Filed: Mar. 1, 1994

[51] Int. Cl.⁶ ................................................ G06F 13/08
[52] U.S. Cl. ........................................ 710/108; 711/142
[58] Field of Search ...................................... 395/725, 425

[56] References Cited

U.S. PATENT DOCUMENTS

| | | | |
|---|---|---|---|
| 4,513,367 | 4/1985 | Chan et al. | 395/425 |
| 5,175,837 | 12/1992 | Arnold et al. | 395/425 |
| 5,222,224 | 6/1993 | Flynn et al. | 395/425 |
| 5,301,290 | 4/1994 | Tetzlaff et al. | 395/425 |
| 5,325,535 | 6/1994 | Santeler et al. | 395/725 |
| 5,369,753 | 11/1994 | Tipley | 395/425 |

OTHER PUBLICATIONS

"The Metaflow Architecture", pp. 10–13 and 63–73, by Val Popescu, Merle Schultz, John Spracklen, Gary Gibson, Bruce Lightner, and David Isaman, IEEE Micro, 1991.

*Primary Examiner*—Ayaz R. Sheikh
*Assistant Examiner*—Rupal D. Dharia
*Attorney, Agent, or Firm*—Blakely, Sokoloff, Taylor & Zafman LLP

[57] ABSTRACT

In a computer system, an apparatus for handling lock conditions wherein a first instruction executed by a first processor processes data that is common to a second processor while the second processor is locked from simultaneously executing a second instruction that also processes this same data. A lock bit is set when the first processor begins execution of the first instruction. Thereupon, the second processor is prevented from executing its instruction until the first processor has completed its processing of the shared data. Hence, the second processor queues its request in a buffer. The lock bit is cleared after the first processor has completed execution of its instruction. The first processor then checks the buffer for any outstanding requests. In response to the second processor's queued request, the first processor transmits a signal to the second processor indicating that the data is now not locked.

15 Claims, 6 Drawing Sheets

APPARATUS AND METHOD FOR CACHING LOCK CONDITIONS IN A MULTI-PROCESSOR SYSTEM

FIELD OF THE INVENTION

The present invention relates to the field of computer systems having multiple processors. More specifically, the present invention pertains to an apparatus and method for caching lock conditions in a multi-processor system.

BACKGROUND OF THE INVENTION

A computer system can be broken into three basic blocks: a central processing unit (CPU), memory, and input/output (I/O) units. These blocks are interconnected by means of a bus. An input device such as a keyboard, mouse, disk drive, analog-to-digital converter, etc., is used to input instructions and data to the computer system via the I/O unit. These instructions and data can be stored in memory. The CPU retrieves the data stored in the memory and processes the data as directed by the stored instructions. The results can be stored back into memory or outputted via the I/O unit to an output device such as a printer, cathode-ray tube (CRT) display, digital-to-analog converter, LCD, etc.

In one instance, the CPU consisted of a single semiconductor chip known as a microprocessor. This microprocessor executed the programs stored in the main memory by fetching their instructions, examining them, and then executing them one after another. Due to rapid advances in semiconductor technology, faster, more powerful and flexible microprocessors were developed to meet the demands imposed by ever more sophisticated and complex software.

In some applications multiple processors are utilized. A singularly complex task can be broken into sub-tasks. Each sub-task is processed individually by a separate processor. For example, in a multiprocessor computer system, word processing can be performed as follows. One processor can be used to handle the background task of printing a document, while a different processor handles the foreground task of interfacing with a user typing on another document. Thereby, both tasks are handled in a fast, efficient manner. This use of multiple processors allows various tasks or functions to be handled by other than a single CPU so that the computing power of the overall system is enhanced. And depending on the complexity of a particular job, additional processors may be added. Furthermore, utilizing multiple processors has the added advantage that two or more processors may share the same data stored within the system.

These processors often contain a small amount of dedicated memory, known as a cache. Caches are used to increase the speed of operation. In a processor having a cache, as information is called from main memory and used, it is also stored, along with its address, in a small portion of especially fast memory, usually in static random access memory (SRAM). As each new read or write command is issued, the system looks to the fast SRAM (cache) to see if the information exists. A comparison of the desired address and the addresses in the cache memory is made. If an address in the cache memory matches the address sought, then there is a hit (i.e., the information is available in the cache). The information is then accessed in the cache so that access to main memory is not required. Thereby, the command is processed much more rapidly. If the information is not available in the cache, the new data is copied from the main memory and stored in the cache for future use.

Because these caches are typically localized, these multiple memory elements in a multiprocessor computer system can (and usually do) contain multiple copies of a given data item. It is important that any processor or other agent accessing any copy of this data receives a valid data value. In other words, cache coherency in hardware must be maintained. For example, given an initial account containing $100 and a financial computer program that instructs a first processor to add $50 to an account while a second processor is subsequently instructed to subtract $30 from that same account, the correct balance should be $100+$50−$30= $120. However, without any mechanism to synchronize or coordinate the instructions between these two processors, the first processor would output a value of $100+$50=$150, while the second processor would output a value of $100− $30=$70. Neither of these two results are correct.

One prior art method for handling this coherency problem involves locking the bus. When a processor encounters a critical section of the computer program, it "locks" the bus so that other processors are denied access until after those critical operations have been performed. Once those critical operations have executed, the bus is unlocked, and other processors are then granted access to the bus. Thus, in the above example, the first processor would first lock the bus and add $50 to the account. In the meantime, the second processor is prevented from carrying out its operation because of the locked condition. Once the first processor completes its execution, the bus is unlocked, and the second processor is assured of receiving the updated account balance of $150, from which the second processor subtracts $30, thereby yielding the correct balance of $120.

However, this prior art mechanism for locking the bus suffers from several drawbacks. Namely, it is very inefficient. Locking the bus reduces the throughput of that bus, which slows down the overall speed of the system. Furthermore, the caches are also essentially locked out. This results in a poor use of cache resources.

Thus, there is a need in the prior art for a lock handling mechanism that provides for a highly effective bus utilization and efficient use of cache resources without adding expensive hardware. It would be preferable if such a lock handling mechanism could readily be adapted to a pipelined bus structure and that it follows a cache coherence protocol.

SUMMARY OF THE INVENTION

The present invention pertains to an apparatus and method for caching lock conditions in a multi-processor system. Initially, when a present processor encounters an instruction that involves the processing of data that is common or shared by other processors of the system, it acquires an exclusive copy of the data item to be processed. This request can be queued at the remote node if the other processor(s) has the lock-in-progress bit set. The present processor sets the lock-in-progress bit. The data is then processed accordingly.

Afterwards, the present processor clears the lock-in-progress bit. In addition, the present processor checks the buffer to determine whether any requests had been queued in the meantime. If there is a request, the present processor transmits a signal to the processor corresponding to the first queued request that it may now proceed. In other words, the other processor is informed that the data is not locked and that it may properly process the data at this point. Thus, in this manner, the present invention allows external concurrent use of caches during an internal lock operation.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for handling caching lock conditions in a multi-processor system is described in detail below. In the following description for purposes of explanation, specific details such as processor configurations, components, bus hierarchies, etc., are set forth in order to provide a thorough understanding of the present invention. However, it will be apparent to one skilled in the art that the present invention may be practiced without these specific details. In other instances, well known structures, devices, functions, and procedures are shown in block diagram form to avoid obscuring the present invention. It should be noted that the present invention can be applied to a variety of different processor architectures. Furthermore, the present invention can be practiced in a variety of manners, such as by a single or multiple chip implementation or by fabrication by silicon or gallium arsenide or other processes.

Figure 1:
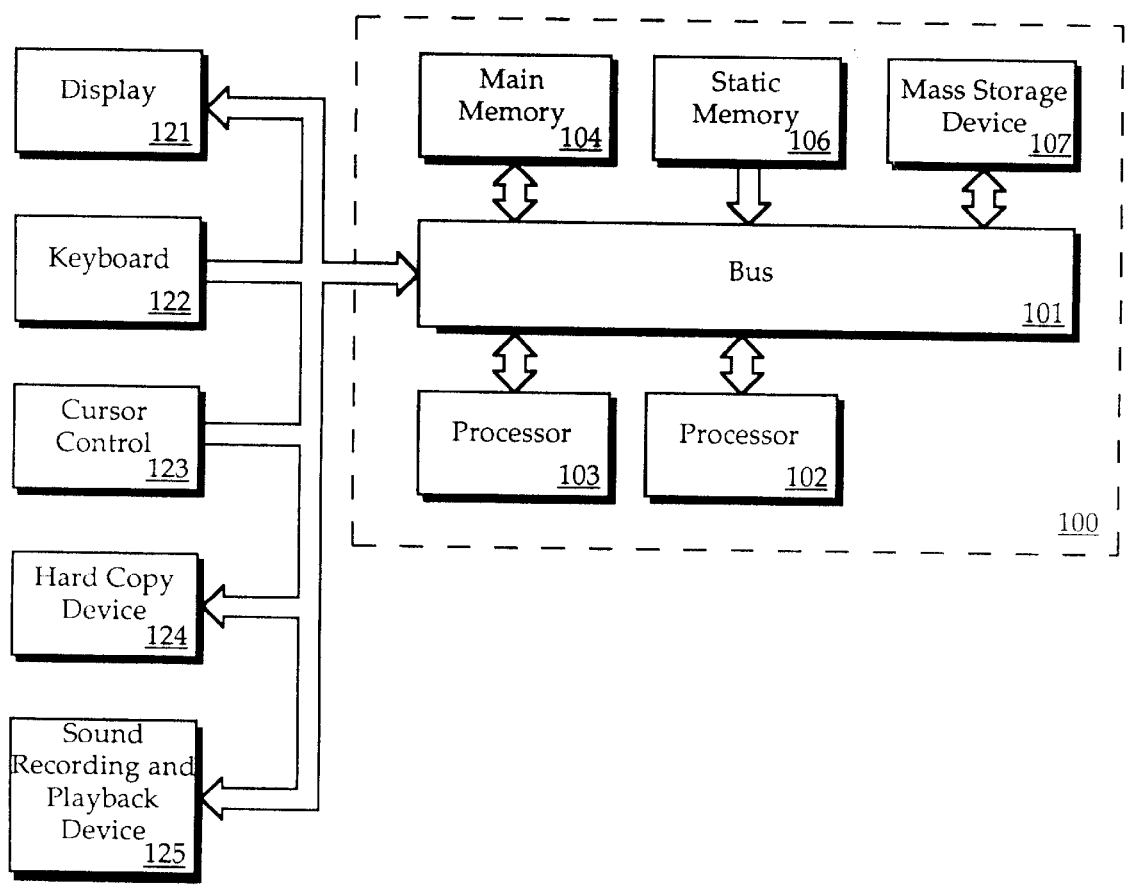
FIG. 1 shows one embodiment of the computer system of the present invention.

Referring now to FIG. 1, the computer system of one embodiment of the present invention is shown as 100. Computer system 100 comprises a bus or other communication means 101 for communicating information, and a processing means 102 coupled with bus 101 for processing information. Processor 102 includes, but is not limited to microprocessors such as the Intel™ architecture microprocessors, Power™, Alpha™, etc. Additional numbers of processors, such as processor 103, may also be coupled to bus 101. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions.

Computer system 100 may further be coupled to a display device 121, such as a cathode ray tube (CRT) or liquid crystal display (LCD) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, stylus, or cursor direction keys, coupled to bus 101 for communicating direction information and command selections to processor 102, and for controlling cursor movement on display 121. Another device which may be coupled to bus 101 is hard copy device 124 which may be used for printing instructions, data or other information on a medium such as paper, film, or similar types of media. Furthermore, a sound recording and playback device, such as a speaker and microphone may optionally be coupled to bus 101 for interfacing with computer system 100. Note that any or all of the components of system 100 and associated hardware may be used in a preferred embodiment, however, it can be appreciated that any type of configuration of the system may be used for various purposes as the user requires.

Figure 2:
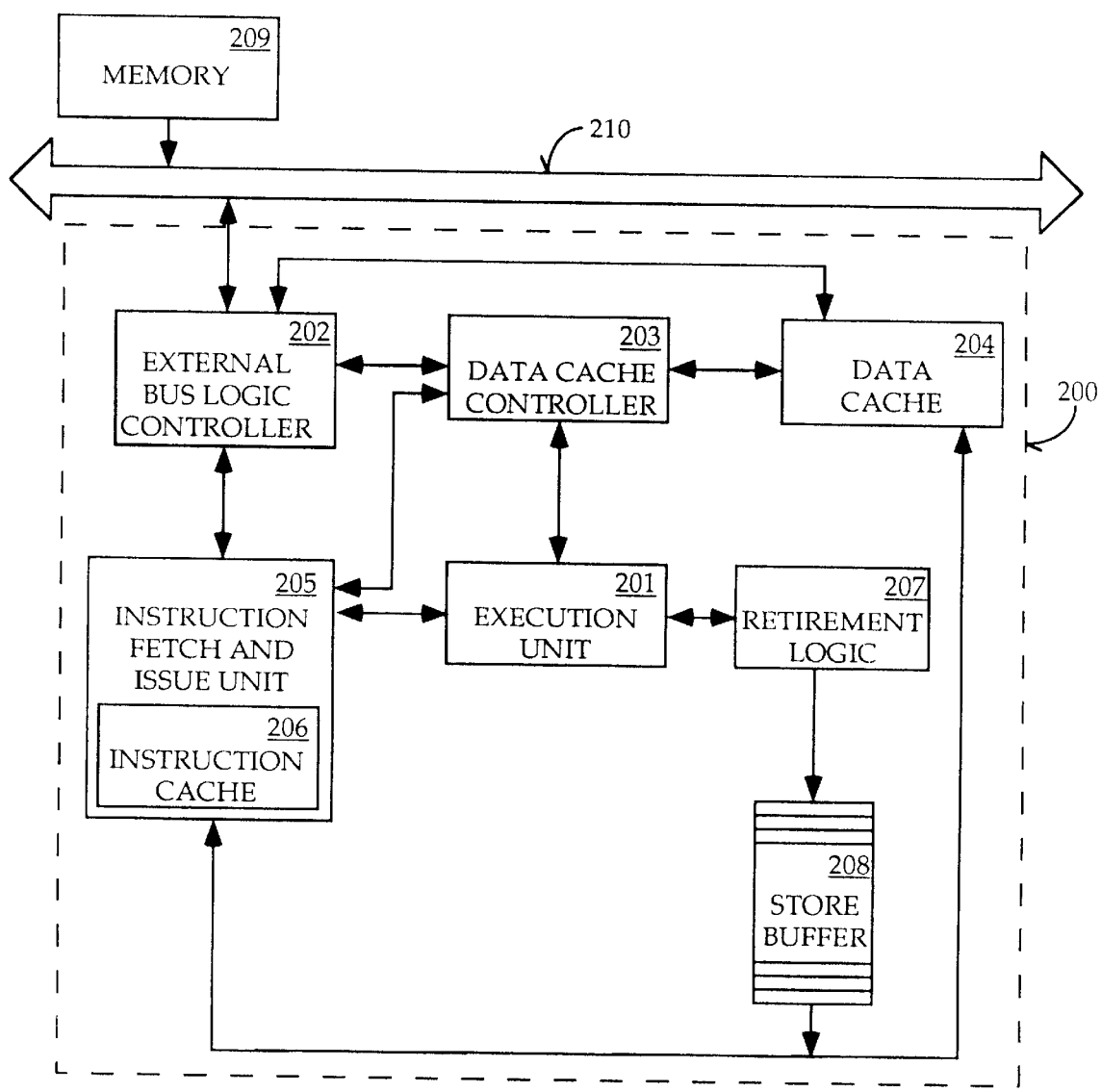
FIG. 2 is a block diagram illustrating an exemplary processor incorporating the teachings of the present invention.

FIG. 2 is a block diagram illustrating an exemplary processor 200 incorporating the teachings of the present invention is shown. The exemplary processor 200 comprises an execution unit 201, an external bus logic controller 202, a data cache controller 203, a data cache 204, and an instruction fetch and issue unit 205 with an integrated instruction cache 206. The elements 201–206 are coupled to each other as illustrated. Together they cooperate to fetch, issue, execute, and save execution results of instructions in a pipelined manner.

The instruction fetch and issue unit 205 fetches instructions from instruction cache 206 and on a cache miss from an external memory through the bus controller 202 via an external system bus. Bus controller 202 manages transfers of data between external components and processor 200. In addition, it also manages cache coherency transfers. The instruction fetch and issue unit 205 then issues these instructions to the execution unit 201 in an in-order sequence. Basically, the execution unit 201 performs such functions as add, subtract, logical AND, and integer multiply. Some of these instructions are fetched and issued speculatively. The execution unit 201 holds and executes the integer and floating point instructions when their operand dependencies on execution results of preceding instructions are resolved. This includes those integer and floating point instructions that are speculatively fetched and issued. In similar fashion, the execution unit 201 holds and forwards the load and store instructions to the retirement logic 207.

Retirement logic 207 commits the states of these instructions to whatever permanent architectural state that was designated by the original source code. Load instruction execution requires data from the actual memory location. Hence loads are retired only after the data becomes available from the local buffers, caches or memory as necessary. However, store instruction execution does not have this limitation. As a result stores are retired immediately and thereupon the retired instructions are sent to store buffer 208. Store buffer 208 is a first-in-first-out (FIFO) structure for storing address, size, data, and other key attributes. The top pointer of the structure points to the store most recently retired. The bottom of store buffer 208 (i.e., the one containing the oldest retired store) is the only one ready to be written to a memory subsystem, such as data cache 204. The store buffer 208 is only visible to the processor core (e.g., execution unit 201 and instruction fetch, issue unit 205, and instruction cache 206). External snoops do not recognize the existence of the store. "Snooping" refers to the act of monitoring data and address traffic for values of interest. If a processor writes to memory 209 at an address that is in the local cache, that cache will have been snooping the memory bus and will notice that it now has a stale copy of that data. That cache entry will then be invalidated. The next time that cache entry is accessed, instead of retrieving outdated data, it will incur a cache miss, and the new data will be forwarded from memory.

Data cache controller 203 controls the access of data to/from the data cache 204. Data cache 204 is a fast, small, hardware-maintained scratchpad memory which can be reached in fewer clock cycles than main memory by loads and stores. The execution unit forwards load instructions immediately to the data cache controller 203 and the data cache 204. This is because a load instruction cannot retire until the data is available from the cache or memory subsystem. In contrast, store instructions are buffered. In other words, memory references are not necessarily forwarded in the order they were issued. Moreover, some memory load references are forwarded due to speculative execution of instructions. In any case, the execution results of the integer, floating point, and load instructions are buffered, and then retired or committed in order. In comparison, the buffered store instructions are retired or committed in order and then executed in the "background," at the convenience of the memory system. Speculative integer, floating point, and load execution results and buffered stores of mis-predicted branches are purged.

The instruction fetch and execution unit 205 is intended to represent a broad category of instruction fetching and issuing elements found in many computer systems. Their constitutions and functions are well known and will not be further described. In the embodiment of FIG. 2, the instruction fetch and issue unit 205 includes an instruction cache 206. The instruction cache 206 is a fast local memory that holds the instructions to be executed. When a program attempts to access an instruction that is not yet or no longer in the cache, the processor must wait until hardware fetches the desired instructions from another cache or memory downstream. It is the responsibility of the instruction fetch and issue unit 205 to decide which instruction cache entry ought to be accessed next for maximal program performance. In the currently preferred embodiment, the instruction cache 206 and data cache 204 exists in a memory hierarchy.

The hierarchy is comprised of a small but extremely fast L1 cache. If a memory access to the L1 cache results in a miss, the access is passed on to a bigger, but slower, L2 cache. And if that also results in a miss, the memory access goes to the L3 cache or to the main memory if the processor happens to not have an L3 cache. The data cache controller 203 is used for page miss handling. Furthermore, there is no requirement for the instructions to be fetched from aligned memory locations. In other words, an instruction may be fetched from memory locations spanning two cache lines. However, it will be appreciated that the present invention may be practiced with or without an instruction cache, or with a combined instruction/data cache. If an instruction cache is implemented, page misses may be handled by a dedicated page miss handler, and instructions may be fetched from aligned memory locations.

Instruction cache 206 is a read only cache. Writes to cache 206 are rare. They need to be correctly handled but are not performance critical. The data cache 204, and cache controller 203 utilize a writeback configuration with M.E.S.I. protocol. The M.E.S.I. (Modified, Exclusive, Shared, or Invalid) protocol depends upon having a shared system bus 210. Furthermore, cache controller 203 must have the ability to: use the same line size for all caches on the memory bus; observe all memory bus activity; maintain state information about every line of cache memory; and take appropriate action to maintain consistency. The M.E.S.I. protocol is implemented by assigning state bits for each cached line. These states are dependent upon both data transfer activities performed by the local processor as the bus master, and snooping activities performed in response to transactions generated by other bus masters.

M.E.S.I. represents 4 states. They define whether a line is valid (i.e., hit or miss), if it is available in other caches (i.e., shared or exclusive), and if it is modified (i.e., has been modified). The four states are defined as follows:

[M]—MODIFIED This state indicates a line which is exclusively available in only this cache (all other caches are I), and is modified (i.e., main memory's copy is stale). A Modified line can be read or updated locally in the cache without acquiring the memory bus. Because a Modified line is the only up-to-date copy of data, it is the cache controller's responsibility to write-back this data to memory on snoop accesses to it

[E]—EXCLUSIVE Indicates a line which is exclusively available in only this cache (all other caches are I), and that this line is not modified (main memory also has a valid copy). Writing to an Exclusive line causes it to change to the Modified state and can be done without informing other caches or memory, so no memory bus activity is generated. On a snoop to E state it is the responsibility of the memory to provide data.

[S]—SHARED Indicates that this line is potentially shared with other caches. The same line may exist in one or more other caches (main memory also has a valid copy). A Shared line can be read by the CPU without a main memory access. Writing to a Shared line may use two policies. Using no write allocate policy a write updates the cache, and also requires the cache controller to generate a write-through cycle to the memory bus. In addition to updating main memory, the write-through cycle will invalidate this line in other caches. Using write allocate policy a write generates an invalidation request transaction on the memory bus. This will invalidate the line in other caches and allow the local cache to be updated and change to Modified state. Main memory is not updated.

[I]—INVALID Indicates that the line is not available in the cache. A read to this cache line will be a miss and cause the cache controller to execute a line fill (i.e., fetch the entire line and deposit it into the cache SRAM). A write to this cache line may use two policies. In no write allocate policy a write will cause the cache controller to execute a write-through cycle to the memory bus. In write allocate policy a read for ownership bus transaction is executed and the line is brought in the cache in ownership state. After that the line is written with updated data and its state is changed to modified.

The states determine the actions of the cache controller with regard to activity related to a line, and the state of a line may change due to those actions. All transactions which may require state changes in other caches are broadcasted on the shared memory bus.

In a writeback configuration, cache 204 is designed to minimize the amount of reads and writes to main system memory 209. These caches have tags that include a bit called the modified dirty(altered) bit. This bit is set if a cache location has been updated with new information and therefore contains information that is more recent than the corresponding information in main system memory 209.

From the description of cache states to follow, it should be clear that only the stores to "E" or "M" states do not generate a bus transaction, and after the store is completed the final cache state is "M". If the same processor reads the same location it will always be guaranteed the updated data by the cache controller. If any other processor read the location the new processor can never find it in its own cache and hence, will always need to generate a bus transaction. During the snoop request corresponding to the bus transaction, the cache controller containing the data in Modified state will intervene and return the updated cache line. Due to the fact that data from a given memory location can reside simultaneously in main memory 209 and in one or more cache memories 204 and 205, and also the data in one cache may have a value different from that in memory because one has been updated more recently, M.E.S.I. ensures that all references to a main-memory location retrieve the most recent value.

Figure 3:
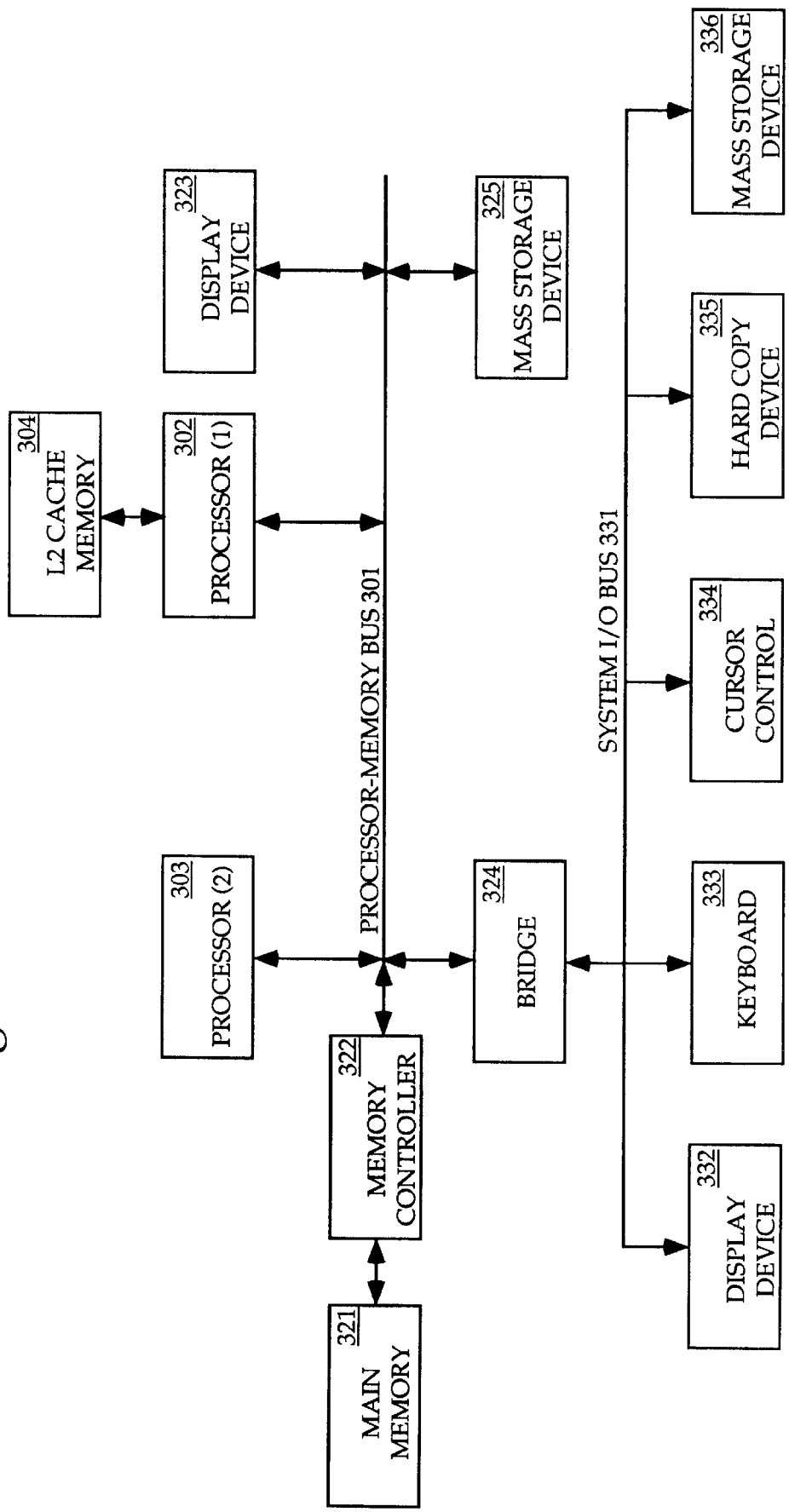
FIG. 3 shows an overview of a multi-processor computer system of the present invention.

FIG. 3 shows an overview of a multiprocessor computer system in accordance with the present invention. The computer system generally comprises a processor-system bus or other communication means 301 for communicating information between one or more processors 302 and 303. Processors 302 and 303 can be of a form as shown in FIG. 2. Processor-system bus 301 includes address, data and control buses. As described above, processors 302 and 303 may include a small, extremely fast internal cache memory, commonly referred to as a level one (L1) cache memory for temporarily storing data and instructions on-chip. In addition, a bigger, slower level two (12) cache memory 304 can be coupled to processor 302 for temporarily storing data and instructions for use by processor 302. In the currently preferred embodiment, the L1 and L2 cache memories are included in the same chip package as processor 302.

Also coupled to processor-memory bus 301 is processor 303 for processing information in conjunction with processor 302. Processor 303 may comprise a parallel processor, such as a processor similar to or the same as processor 302. Alternatively, processor 303 may comprise a co-processor, such as a digital signal processor. The processor-memory bus 301 provides system access to the memory and input/output (I/O) subsystems. A memory controller 322 is coupled with processor-memory bus 301 for controlling access to a random access memory (RAM) or other dynamic storage device 321 (commonly referred to as a main memory) for storing information and instructions for processor 302 and processor 303. Memory controller 312 maintains a strong order of read and write operations. A mass data storage device 325, such as a magnetic disk and disk drive, for storing information and instructions, and a display device 323, such as a cathode ray tube (CRT), liquid crystal display (LCD), etc., for displaying information to the computer user are coupled to processor memory bus 301.

An input/output (I/O) bridge 324 is coupled to processor memory bus 301 and system I/O bus 331 to provide a communication path or gateway for devices on either processor memory bus 301 or I/O bus 331 to access or transfer data between devices on the other bus. Essentially, bridge 324 is an interface between the system I/O bus 331 and the processor memory bus 301.

In order to reduce the bandwidth requirement, bridge 324 turns the byte/word/dword data transfer traffic from I/O bus 331 into line size traffic on processor memory bus 301. I/O bus 331 communicates information between peripheral devices in the computer system. Devices that may be coupled to system bus 331 include a display device 332, such as a cathode ray tube, liquid crystal display, etc., an alphanumeric input device 333 including alphanumeric and other keys, etc., for communicating information and command selections to other devices in the computer system (e.g., processor 302) and a cursor control device 334 for controlling cursor movement. Moreover, a hard copy device 335, such as a plotter or printer, for providing a visual representation of the computer images and a mass storage device 336, such as a magnetic disk and disk drive, for storing information and instructions may also be coupled to system bus 331. In some implementations, it may not be required to provide a display device for displaying information. Certain implementations of the present invention may include additional processors or other components.

Figure 4:
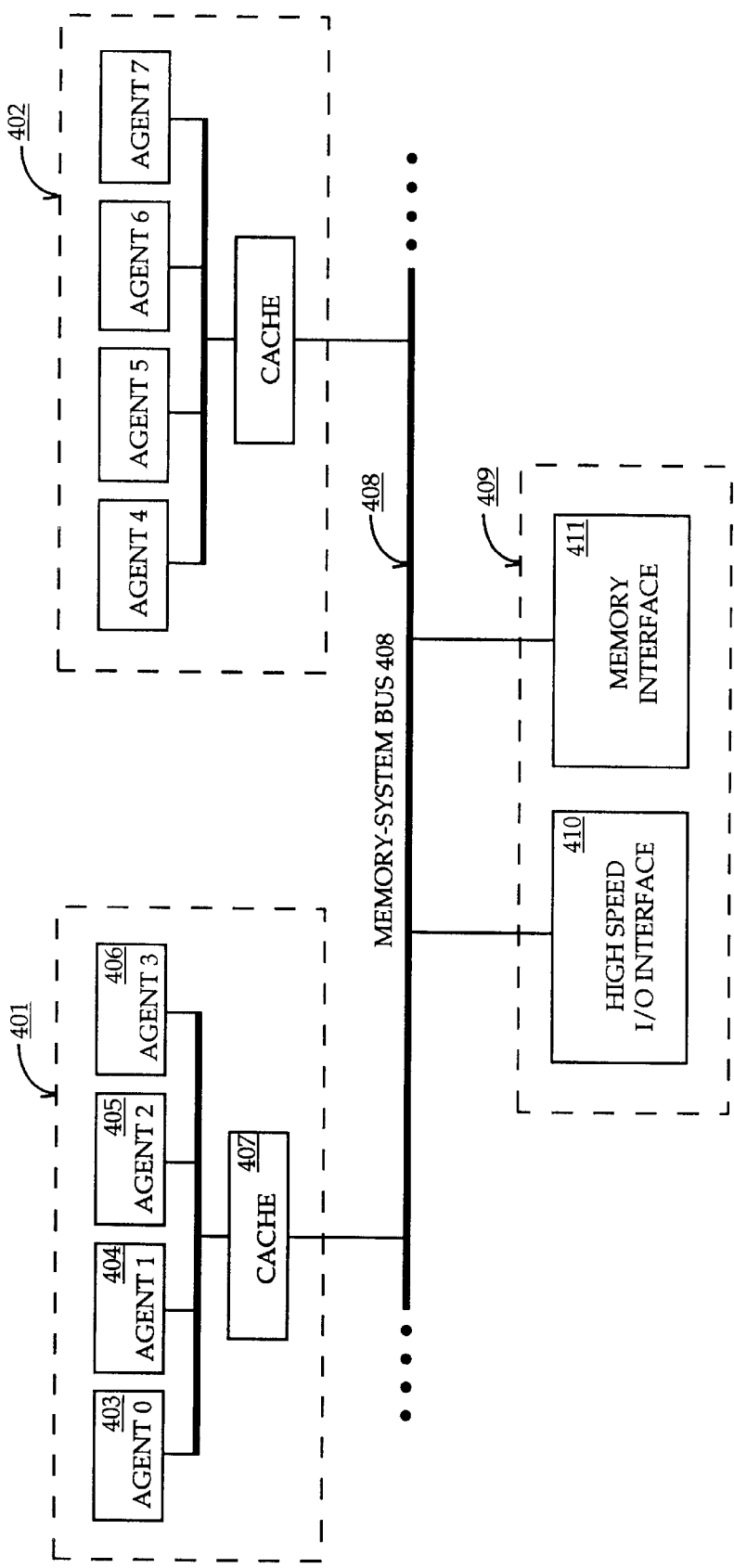
FIG. 4 is a block diagram showing a bus cluster system of the present invention.

FIG. 4 is a block diagram showing a bus cluster system upon which the present invention may be practiced. The present invention can apply to multiprocessor computer systems having one or more clusters of processors. FIG. 4 shows two such clusters 401 and 402. Each of these clusters are comprised of a number of processors. For example, cluster 401 is comprised of four agents 403–406 and a cache 407. Agents 403–406 can include microprocessors, co-processors, digital signal processors, etc. Cache 407 is shared between these four agents 403–406. Each cluster is coupled to a memory system bus 408. These clusters 401–402 are coupled to various other components of the computer system through a system interface 409. The system interface 409 includes a high speed I/O interface 410 for interfacing the computer system to the outside world and a memory interface 411 which provides access to a main memory, such as a DRAM memory array (these interfaces are described in greater detail in FIG. 3).

Figure 5:
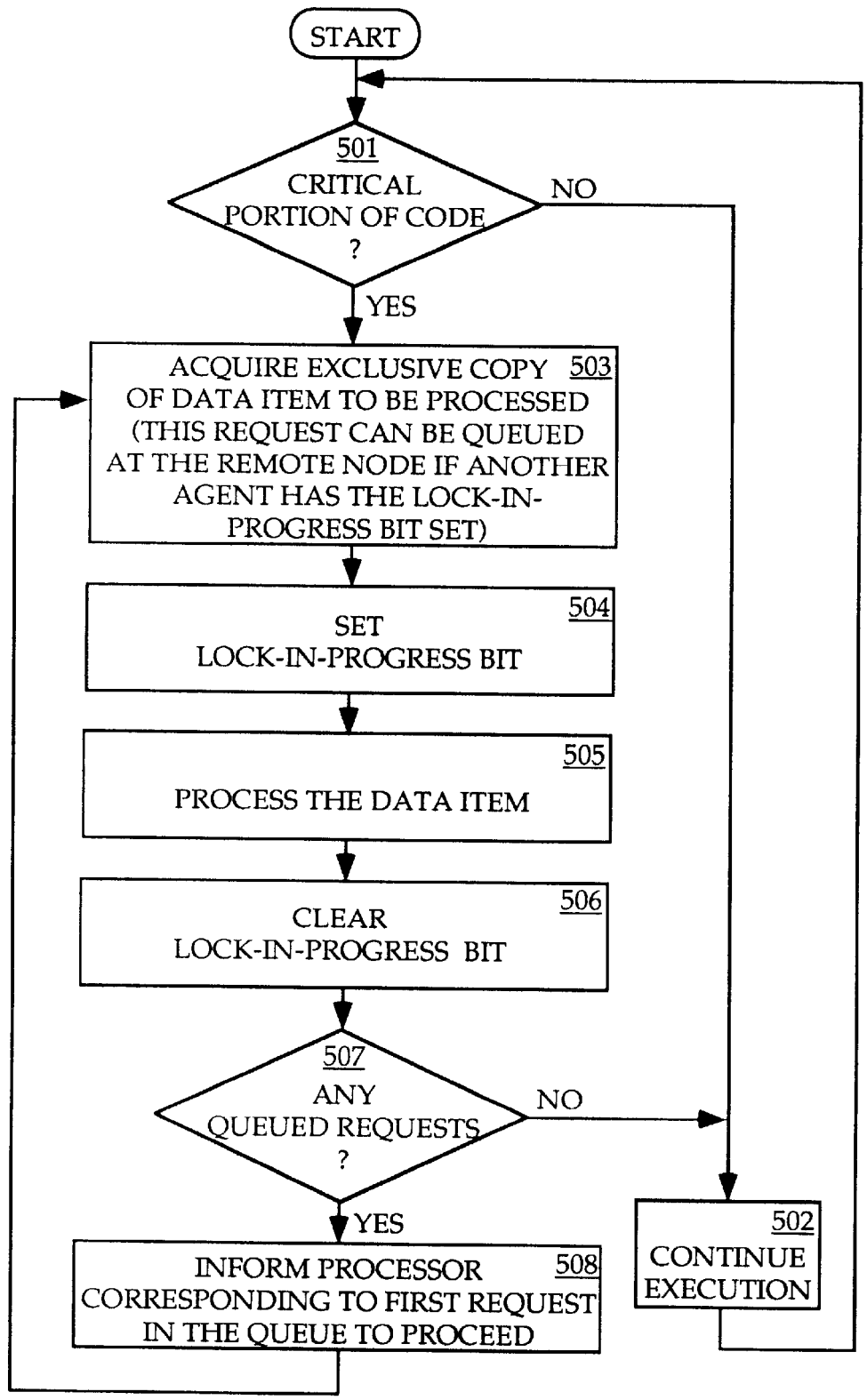
FIG. 5 shows a flowchart describing the steps for performing the lock handling process of the present invention.

FIG. 5 shows a flowchart describing the steps for performing the lock handling process of the present invention. Initially, a determination is made as to whether a portion of a code to be executed is critical, step 501. In the embodiment shown, the program structure, such as an exchange byte instruction, initiates a read-modify-write operation. Upon receipt of a read-modify-write operation, the processor determines whether the data is cacheable. If the data is cacheable, it is treated as a cache lock. Consequently, the cache lock process is initiated before the read portion of the read-modify-write operation. If it has been determined that a read-modify-write operation is not being performed, execution of the code continues as normal, step 502.

The processor then acquires an exclusive copy of the data item to be processed, step 503. In the currently preferred embodiment, a response queue buffer is implemented as part of the External Bus Logic. This response queue buffer stores the address and type (e.g., read, write, and invalidate) of the request if the lock-in-program bit is set. Once the request is queued, the processor waits for the receipt of a signal allowing it to proceed. The processor sets the Lock-In-Progress bit, step 504. The data item is processed, step 505. Thereupon, the Lock-In-Progress bit is cleared, step 506. In the currently preferred embodiment, the Lock-In-Progress bit is cleared when the processor comes out of the write portion of the read-modify-write operation. Next, the processor checks the response queue buffer to determine whether there are any queued requests, step 507. If there are no queued requests stored in the response queue buffer, execution of the code continues as normal, step 502. Otherwise, the particular processor corresponding to the first request stored in the response queue buffer is informed that it may proceed, step 508. That particular processor then performs steps 503–508. It should be noted that the present invention allows external concurrent use of caches during an internal block operation.

Figure 6:
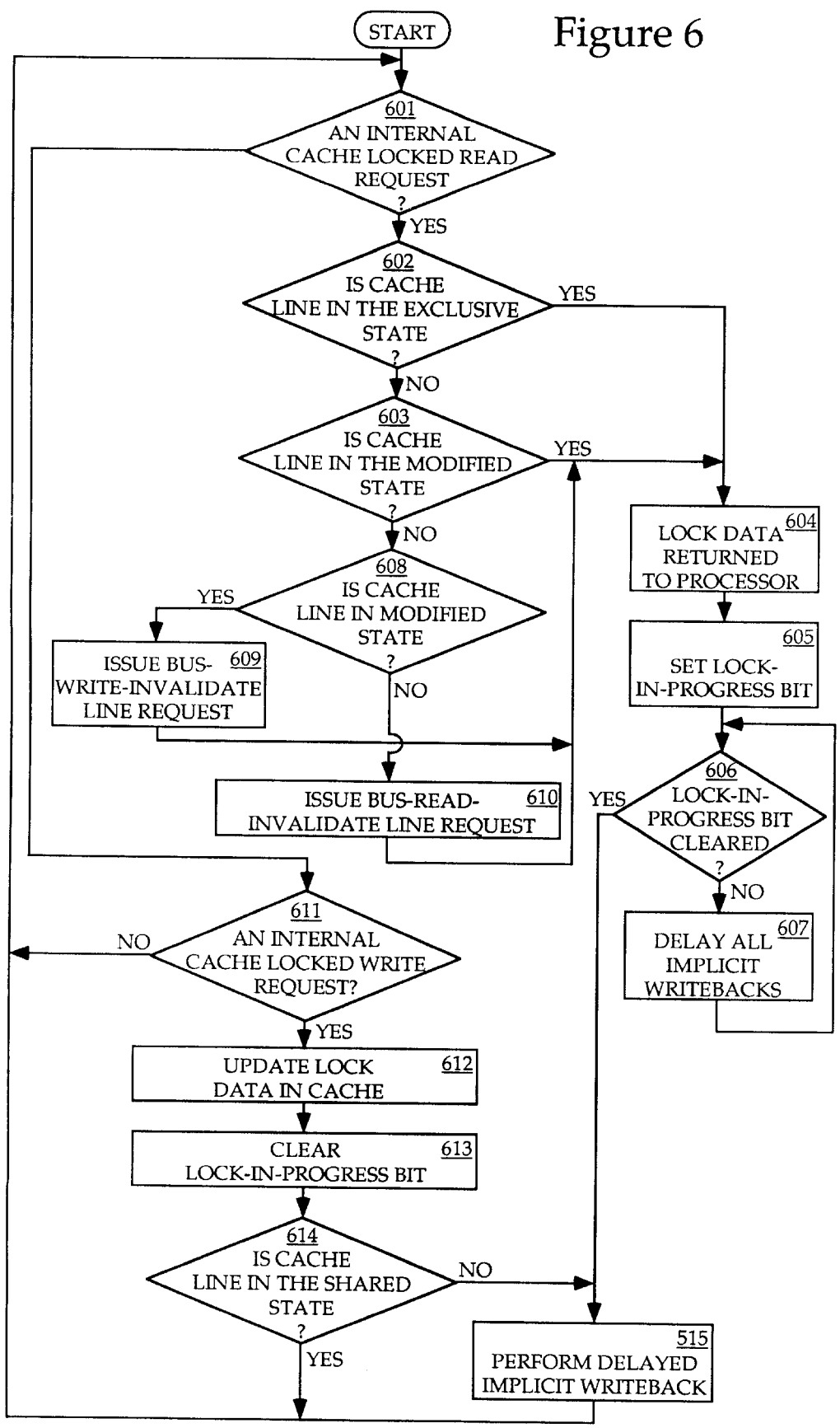
FIG. 6 shows a flowchart describing the steps for performing the cache lock process for one embodiment of the present invention.

FIG. 6 shows a flowchart describing the steps for performing the cache lock process for the currently preferred embodiment of the present invention. Initially, a determination is made as to whether an internal cache locked read request has been made by a processor, step 601. An internal cache locked read request is a request initiated by the processor core to perform a read on a cacheable lock. If such a request has been made, a determination is made in step 602 as to whether the cache line is in the Exclusive state. In step 603, a determination is made as to whether the cache line is in the Modified state. If the cache line is in the Exclusive or Modified state, the lock data is returned to the processor, step 604. The Lock-In-Progress bit is then set, step 605. Next, a determination is made as to whether the Lock-In-Progress bit has been cleared, step 606. If it has been determined that the Lock-In-Progress bit has been cleared, a delayed implicit writebacks are performed, step 615. If the Lock-In-Progress bit has not been cleared yet, all implicit writebacks are delayed, step 607. An implicit writeback is a response to another transaction on the bus when an external request (from another caching agent) hits a Modified line in the local cache or buffer, an implicit writeback is performed to provide the modified line and at the same time, update the memory.

If the cache line is neither in the Exclusive state nor in the Modified state, a determination is made as to whether the cache line is in the Shared state, step 608. If the cache line is in the Shared state, a Bus-Write-Invalidate Line request is issued, step 609. This Bus-Write-Invalidate Line transaction indicates that the requesting processor contains the line in the Shared state and it intends to modify the line. The flow then progresses to step 604. If, however, the cache line is not in either the Exclusive, Modified, or Shared state, it is assumed to be in the Invalid state and that the requested line is not in the local cache. In this instance, the processor issues a Bus-Read-Invalidate Line request, step 610. This Bus-Read-Invalidate Line request indicates that the requesting processor has had a read miss and intends to modify the line when the line is returned. The flow then progresses to step 604.

If there has not been an internal cache locked read request as determined in step 601, a determination is made as to whether an internal cache locked write request has occurred, step 611. An internal cache locked write request is a request initiated by the processor core to perform a write on a cacheable lock. If there has not been an internal cache locked write request, step 601 is repeated. Otherwise, the lock data in the cache is updated, step 612. The Lock-In-Progress bit is then cleared, step 613. Thereupon, a determination is made as to whether the cache line is in the Modified state, step 614. If the cache line is not in the Modified state, the delayed implicit writeback is performed, step 615. Otherwise, step 601 is repeated.

Table 1 below summarizes the state transitions in response to an internal Cache Locked Read Operation.

TABLE 1

| Present State | Action | Snoop Result | Next State |
|---|---|---|---|
| M | Give data to processor, set lock in progress bit, and delay all implicit writebacks. | N.A. | M |
| F | Give data to processor, set lock in progress bit, and delay all implicit writebacks. | N.A. | M |
| S | Issue Write Invalidate Line request, give data to processor, set lock in progress bit, and delay all implicit writebacks. | not deferred | M |
| I | Issue Read Invalidate Line request, give data to processor, set lock in progress bit, and delay all implicit writebacks. | not deferred | M |
| S | Issue a Write Invalidate Line request | Deferred | S |
| I | Issue a Read Invalidate Line request | Deferred | I |

Table 2 below summarizes the state transitions in response to an internal Cache Locked Write Operation.

TABLE 2

| Present State | Action | Snoop Result | Next State |
|---|---|---|---|
| M | Update cache, clear the lock in progress bit. | N.A. | M |
| F | Update cache, clear the lock in progress bit, perform delayed implicit writeback. | N.A. | F |
| S | Update cache, clear the lock in progress bit, perform delayed implicit writeback. | N.A. | S |
| I | Update cache, clear the lock in progress bit, perform delayed implicit writeback. | N.A. | I |

Table 3 below summarizes the state transition in response to a deferred reply.

TABLE 3

| | Current State | Actions | Next State |
|---|---|---|---|
| Write Invalidate Line Deferred Reply | S | Give data to processor, set the lock-in-progress bit and delay implicit writebacks | M |
| Write Invalidate Line Deferred Reply | I | Give data to processor, set the lock-in-progress bit and delay implicit writebacks | M |
| Read Invalidate Line Deferred Reply | I | Give data to processor, set the lock-in-progress bit and delay implicit writebacks | M |

Thus, an apparatus and method for caching lock conditions in a multi-processor system is disclosed.

What is claimed is:

1. In a computer system including a memory coupled to a first processor having an internal cache, said first processor coupled to at least one remote agent on a bus, said bus supporting snooping by said first processor and said at least one remote agent, a method of operation comprising the steps of:

(a) acquiring by said first processor an exclusive copy of a cache line;

(b) setting a lock bit by said first processor to lock said internal cache;

(c) processing said exclusive copy of said cache line by said first processor;

(d) receiving by said first processor a request from said remote agent for said cache line;

(e) transferring ownership, but not the data associated with, said cache line from said first processor to said remote agent;

(f) clearing said lock bit by said first processor;

(g) transferring the data associated with said cache line from said first processor to said remote agent.

2. The method of claim 1 further comprising the step of:

delaying implicit writeback operations by said first processor until said lock bit has been cleared.

3. The method of claim 1 further comprising the step of:

issuing a bus write invalidate line request if said cache line is in a Shared protocol state.

4. The method of claim 1 further comprising the step of:

issuing a bus read invalidate line request if said cache line is not in an Exclusive, a Modified, or said Shared protocol state.

5. The method of claim 1 further comprising the step of:

updating said cache line in said internal cache in response to an internal cache locked write request.

6. A computer system comprising:

a bus supporting snooping operations;

first and second processors coupled to said bus, said first processor having a local cache;

a main memory coupled to said bus, said main memory being shared by said first and second processors;

and wherein said first processor further includes means for acquiring an exclusive copy of a cache line and then locking;

said local cache by setting a lock bit when said first processor begins execution of a portion of code, said means clearing said lock bit upon completion of said portion of code;

said means including a queue storing a request for a cache line in said local cache which is owned by said first processor, said request being generated by said second processor while said lock bit is set, said means transferring ownership of said cache line, but not the data associated therewith, to said second processor at the time of said request, the data associated with said cache line being transferred to said second processor after said lock bit has been cleared.

7. The computer system of claim 6 wherein said means comprises a memory controller coupled to said main memory and said bus, said memory controller updating data associated with said cache line during a locked write request by said first processor to said local cache.

8. The computer system of claim 6 further comprising first and second clusters of agents coupled to said bus through respective first and second caches, wherein said first processor is within said first cluster and said second processor is within said second cluster.

9. The computer system of claim 6 wherein said means issues a bus read invalidate line request in the event that said cache line is not located in said local cache.

10. The computer system of claim 9 wherein said means issues a bus write invalidate line request in the event that said cache line is shared.

11. The computer system of claim 7, wherein said memory controller clears said lock bit after the data associated with said cache line has been updated.

12. The computer system of claims 6, 7, 8, 9, 10 or 11, wherein said particular portion of code comprises a read-modify-write operation.

13. The computer system of claim 7, wherein said particular portion of code comprises a read-modify-write operation, and wherein said memory controller clears said lock bit following said read-modify-write operation.

14. The computer system of claim 6, wherein said request comprises an address and a request type.

15. The computer system of claim 14, wherein said request comprises either a read, a write, or an invalidate operation.

* * * * *

UNITED STATES PATENT AND TRADEMARK OFFICE
CERTIFICATE OF CORRECTION

PATENT NO. : 6,006,299
DATED : December 21, 1999
INVENTOR(S) : Wang et al.

Page 1 of 1

It is certified that error appears in the above-identified patent and that said Letters Patent is hereby corrected as shown below:

Column 3,
Line 45, after "Power" insert -- PC --.

Signed and Sealed this

Eleventh Day of December, 2001

Attest:

NICHOLAS P. GODICI
Attesting Officer  Acting Director of the United States Patent and Trademark Office